July 11, 1967 F. SEDLMAIER 3,330,505

THRUST REVERSAL AND AERODYNAMIC BRAKE FOR AIRCRAFT

Filed May 18, 1965

INVENTOR
Franz Sedlmaier

By McGlew and Toren
ATTORNEYS 3,330,505
THRUST REVERSAL AND AERODYNAMIC
BRAKE FOR AIRCRAFT
Franz Sedlmaier, Rosenheim, Germany, assignor to Bolkow Gesellschaft mit beschrankter Haftung, Ottobrunn, near Munich, Germany
Filed May 18, 1965, Ser. No. 456,626
Claims priority, application Germany, May 22, 1964,
B 76,879
9 Claims. (Cl. 244—113)

This invention relates to the braking of jet propelled aircraft and, more particularly, to a novel self-contained braking arrangement for a jet propelled aircraft of the type provided with jet engines having lateral exhaust gas discharge ports.

By the term "self-contained" is meant a braking arrangement which is mounted on the aircraft and is operable independent of any cooperating means located on the ground.

Known self-contained braking arrangements for jet propelled aircraft include braking flaps as well as jet stream reversing devices. Experience has demonstrated that braking flaps are particularly effective at high flying speeds, while jet stream reversing arrangements are particularly effective at low flying speeds. For this reason, it has been common to provide jet propelled aircraft with both types of braking arrangements, in order to provide effective braking in all speed ranges through which the aircraft travels. However, it will be appreciated that the incorporation of both braking systems in a single aircraft is disadvantageous from a constructional point of view as well as from the point of view of the weight of the aircraft. Additionally, the provision of both braking systems in an aircraft makes the aircraft more difficult to handle and service.

An object of the present invention is to provide a self-contained braking arrangement for jet propelled aircraft, and which is simple to install, maintain and use.

Another object of the invention is to provide a self-contained braking arrangement for jet propelled aircraft having a substantial weight reduction as compared to present self-contained braking arrangements.

A further object of the invention is to provide a self-contained braking arrangement for jet propelled aircraft in which the constructional requirements are reduced as compared to known self-contained braking arrangements.

Still another object of the present invention is to provide a self-contained braking arrangement for jet propelled aircraft which has superior action as compared to known braking arrangements.

A further object of the invention is to provide a self-contained braking arrangement for jet propelled aircraft and involving a single braking arrangement which is effective irrespective of the speed at which the aircraft may be traveling.

Yet another object of the invention is to provid a self-contained braking arrangement for jet propelled aircraft and involving pivoted flaps movable from a retracted position, in which they serve a function of cooling parts of the aircraft, through an intermediate position, in which they act as aerodynamic brakes, and to a third position in which they are effective to reverse the thrust of the jet engines.

In accordance with the invention, the braking arrangement is mounted on the nacelle, pod or other housing, of a jet engine having lateral exhaust gas discharge ports through which the jet engine exhaust gases are directed generally rearwardly of the aircraft. The braking arrangement includes flaps, each of which is positioned downstream of a respective exhaust gas outlet. These flaps are provided with apertures which have deflecting vanes extending thereacross. The flaps are swingable from a retracted position within the contour of the jet engine housing or nacelle into operative positions in which they act as dynamic braking flaps in the flying direction. The flaps may further be moved to a position in which they bear against the associated engine outlets. In this latter position, the channels which are formed by the deflecting vanes in the flaps, and which traverse the flaps, constitute a continuation of the engine outlets and serve to deflect the jet discharge gases in a direction which is at least partly forwardly of the aircraft.

These flaps perform three functions. In their retracted position, they serve as heat shields for those portions of the engine enclosure or nacelle which are situated downstream of the associated exhaust gas discharge ports, and thus protect such portions of the engine enclosure from the hot jet gases. Their protective action may be still further increased by permitting cool air, which is aspirated by the jet wake of the gases, to enter or to move from the interior of the engine enclosure through the channels formed by the deflecting vanes in the flaps and through other interstices of the flaps. In this manner, both the flaps and those portions of the engine enclosure which are situated downstream from the exhaust gas discharge ports are extensively cooled. Since the flaps are always made of heat resistant material, they perform this cooling task in a very advantageous manner.

When the flaps are extended from their retracted position toward the position in which they are adjacent the exhaust gas port, they act, over the entire range between the retracted position and the port covering position, as aerodynamic brakes. The strongest aerodynamic braking action is exerted when the flaps are in a plane which is transverse to the direction of flight of the aircraft. In order to increase the braking action, the jet driving gases may be caused to impinge on the transversely, or substantially transversely, extending flaps, whereby the driving gases are deflected transversely of the flying direction. This particular feature is equivalent, in effect, to an increase in the size of the flaps.

The flaps perform a third function when they are positioned against the associated exhaust gas discharge ports or outlets. In this latter position, they have the discharge gases pass therethrough, and the deflecting vanes of the flaps direct the driving gases at least somewhat forwardly of the aircraft so that the engine thrust acts to slow the aircraft.

A change of the engine thrust in accordance with the flap position is not absolutely necessary. In view of the factors mentioned above, and in order to obtain the best braking action, it is advantageous, both with the flaps extending transversely and also with the flaps bearing against the exhaust gas discharge ports, to have the engine run in an unthrottled manner. Thereby greater safety during landing is obtained since, in the event it should be necessary to take off again, it is merely necessary to pivot the flaps back into the retracted position in order to have available the full engine thrust for acceleration of the aircraft.

Although the movements of the flaps preferably are accomplished by hydraulic actuators, electrical, pneumatic, or purely mechanical actuators may also be used within the scope of the invention. Furthermore, and in order to assure sufficient aerodynamic braking action, in accordance with a modification of the invention, the flap surfaces are larger than the cross sectional areas of the associated exhaust gas discharge ports.

For an understanding of the principles of the invention, reference is made to the following description of a typical embodiment thereof, as illustrated in the accompanying drawings.

Figure 1:
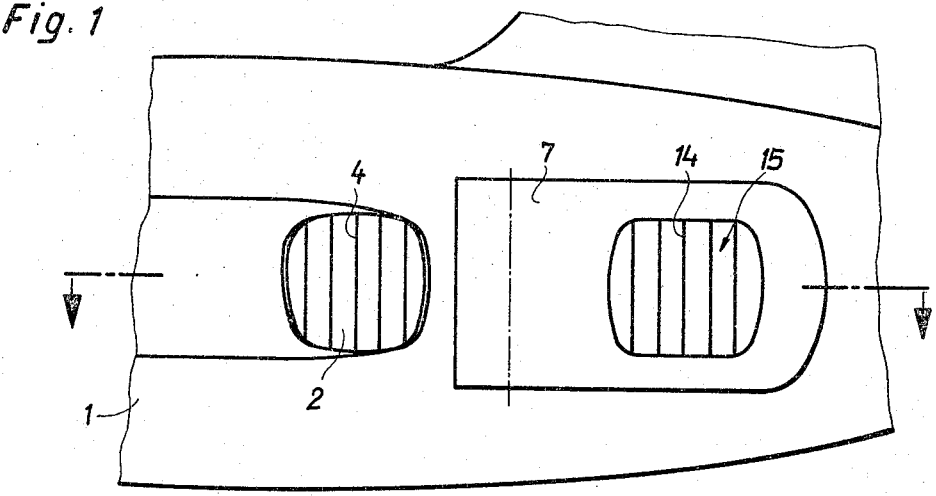
FIG. 1 is a partial side elevation view of a braking arrangement embodying the invention and position adjacent the fuselage of a jet propelled aircraft.

Referring to the drawings, on both sides of fuselage 1 there are arranged exhaust gas outlets or ports 2 of a jet engine 3. These exhaust gas outlets or ports 2 are provided with guide vanes 4 which deflect the aircraft driving jet exhaust gases, which flow transversely through the fork-shaped exhaust gas conduit 5, rearwardly substantially parallel to the longitudinal axis 6 of the aircraft.

In accordance with the invention, each exhaust gas port 2 has positioned downstream thereof a pivoted flap 7 which is pivotal about a pivot bearing 8. Flaps 7 are pivotal outwardly of the fuselage by means of preferably hydraulic actuators 9 which are supplied with hydraulic fluid through lines 12 and 13.

Figure 2:
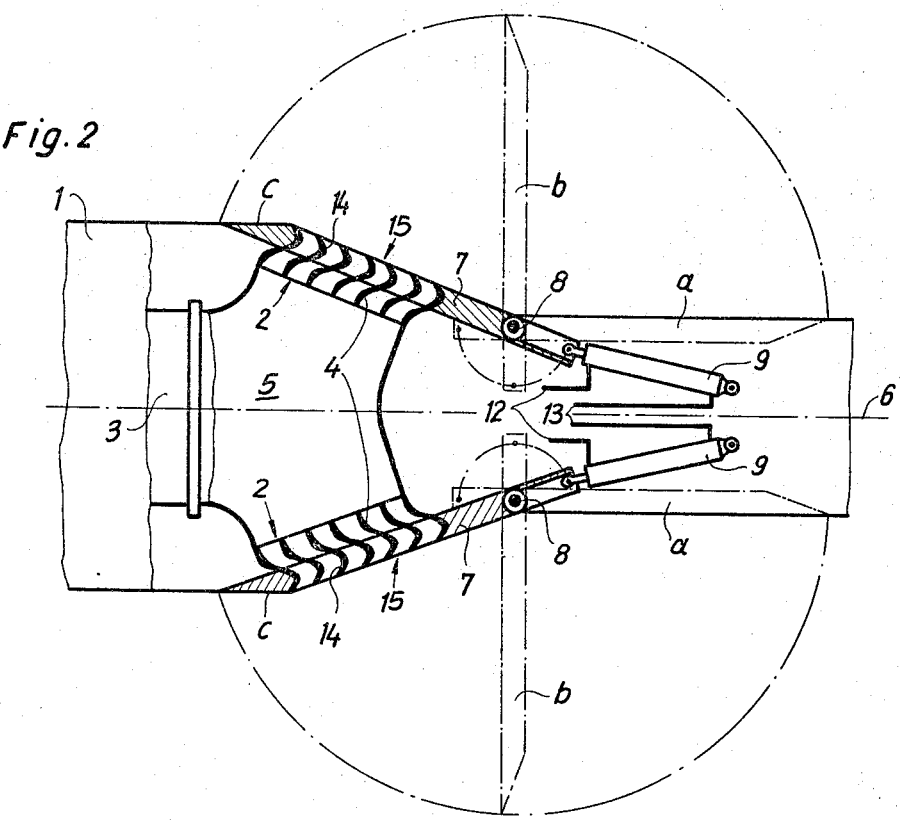
FIG. 2 is a horizontal sectional view taken on the line 2—2 of FIG. 1.

The flaps 7 have three positions. In one position they are retracted within the contour of the engine enclosure, and this retracted position is indicated at a. In position a, flaps 7 function as heat shields. By operating actuators 9, flaps 7 are pivoted out of the retracted position a into any one of several positions b in which they act as dynamic braking flaps. Only one position b is shown diagrammatically in FIG. 2. It will be noted that the flaps, in moving through positions b from position a, move against the flying direction until the flaps bear against the associated exhaust gas discharge ports or outlets 2, which position is indicated at c.

Each flap 7 has an opening whose size and shape corresponds to the size and shape of the associated exhaust gas discharge 2. This opening 15 is provided with deflecting vanes 14. The position of openings 15 relative to the pivot axes 8 is so selected that, in flap position c, the channels formed between deflecting vanes 14 and which extend through flap 7, constitute continuations of the exhaust gas ports 2. However, these channels in the flaps 7, by virtue of the reflecting vanes 14, deflect the jet exhaust gases in a direction extending at least somewhat forwardly of the aircraft. Consequently, in flap position c, there is obtained a thrust reversal.

In the retracted position a of flap 7, openings 15 serve to permit passage of cooling air, entrained and aspirated by the jet wake of the driving gases, from the interior of the fuselage through the flaps 7. It will further be noted that, in order to obtain effective aerodynamic braking action, the effective areas of flaps 7 are substantially larger than the effective areas of the associated exhaust gas discharge ports 2.

While a specific embodiment of the invention has been shown and described in detail in order to illustrate the application of the principles of the invention, it will be understood that the invention may be embodied otherwise without departing from such principles.

What is claimed is:

1. A braking arrangement for jet propelled aircraft having jet engine exhaust gas discharge ports opening through the engine enclosure laterally of the flight direction, said braking arrangement comprising, in combination, flaps, each associated with a respective discharge port; means pivotally mounting each flap for pivoting about an axis disposed downstream of the associated discharge port; operating means connected to each flap to pivot the same, through an intermediate position range in which each flap acts as a dynamic brake, between a retracted position in which each flap extends rearwardly from its pivot axis and is within the contour of the enclosure to a jet thrust controlling position in which each flap extends forwardly from its pivot axis and overlies its associated discharge port; each flap including means operable, in the jet thrust controlling position, to deflect the jet gases, discharged through its associated discharge port, in a direction forwardly of the aircraft.

2. A braking arrangement for jet propelled aircraft having jet engine exhaust gas discharge ports opening through the engine enclosure laterally of the flight direction, said braking arrangement comprising, in combination, flaps, each associated with a respective discharge port; means pivotally mounting each flap for pivoting about an axis disposed downstream of the associated discharge ports; operating means connected to each flap to pivot the same, through an intermediate position range in which each flap acts as a dynamic brake, between a retracted position in which each flap extends rearwardly from its pivot axis and is within the contour of the enclosure, to a jet thrust controlling position in which each flap extends forwardly from its pivot axis and overlies its associated discharge port; each flap being formed with a flow deflecting aperture therethrough effective, in the jet thrust controlling position, to deflect the jet gases, discharged through its associated discharge port, in a direction forwardly of the aircraft.

3. A braking arrangement for jet propelled aircraft having jet engine exhaust gas discharge ports opening through the engine enclosure laterally of the flight direction, said braking arrangement comprising, in combination, flaps, each associated with a respective discharge port; means pivotally mounting each flap for pivoting about an axis disposed downstream of the associated discharge port; operating means connected to each flap to pivot the same, through an intermediate position range in which each flap acts as a dynamic brake, between a retracted position in which each flap extends rearwardly from its pivot axis and is within the contour of the enclosure, to a jet thrust controlling position in which each flap extends forwardly from its pivot axis and overlies its associated discharge port; said flaps including means operable, in the jet thrust controlling position, to deflect the jet gases, discharged through its associated discharge port, in a direction forwardly of the aircraft; said flaps, in the retracted position, acting as heat protection shields for those portions of the enclosure downstream of the discharge ports.

4. A braking arrangement for jet propelled aircraft having lateral jet engine exhaust gas discharge ports through the engine enclosure, said braking arrangement comprising, in combination, flaps each associated with a respective discharge port; means pivotally mounting each flap for pivoting about an axis disposed downstram of the associated discharge port; operating means connected to each flap to pivot the same, through an intermediate position range, between a retracted position in which each flap is within the contour of the enclosure, to a jet thrust controlling position in which each flap overlies its associated discharge port; each flap being formed with an aperture therethrough congruent with its associated discharge port; and deflecting vanes extending across the aperture in each flap and forming deflecting channels therebetween which, in the jet thrust controlling position of the associated flap, deflect the gases, discharged through the associated discharge port, in a direction forwardly of the aircraft.

5. A braking arrangement for jet propelled aircraft having lateral jet engine exhaust gas discharge ports through the engine enclosure, and braking arrangement comprising, in combination, flaps, each associated with a respective discharge port; means pivotally mounting each flap for pivoting about an axis disposed downstream of the associated discharge port; operating means connected to each flap to pivot the same, through an intermediate position range, between a retracted position in which each flap is within the contour of the enclosures, to a jet thrust controlling position in which each flap overlies its associated discharge port; each flap being formed with an aperture therethrough congruent with its associated discharge port; and deflecting vanes extending across the aperture in each flap and forming deflection channels therebetween which, in the jet thrust controlling position of the associated flap, deflect the gases, discharged through the associated discharge port, in a direction forwardly of the aircraft; said flaps, in the retracted position, directing cooling air, entrained by the jet discharge, in cooling relation with those portions of the enclosure downstream of the discharge ports.

6. A braking arrangement for jet propelled aircraft having lateral jet engine exhaust gas discharge ports through the engine enclosure, said braking arrangement comprising, in combination, flaps, each associated with a respective discharge port; means pivotally mounting each flap for pivoting about an axis disposed downstream of the associated discharge port; operating means connected to each flap to pivot the same, through an intermediate position range, between a retracted position in which each flap is within the contour of the enclosure, to a jet thrust controlling position in which each flap overlies its associated discharge port; each flap being formed with an aperture therethrough congruent with its associated discharge port; and deflecting vanes extending across the aperture in each flap and forming deflection channels therebetween which, in the jet thrust controlling position of the associated flap, deflect the gases, discharged through the associated discharge port, in a direction forwardly of the aircraft; said flaps, in the retracted position, directing cooling air, entrained by the jet discharge, in cooling relation with those portions of the enclosure downstream of the discharge ports; said flaps, in the intermediate position range, functioning as aerodynamic brakes.

7. A braking arrangement for jet propelled aircraft having lateral jet engine exhaust gas discharge ports through the engine enclosure, said braking arrangement comprising, in combination, flaps, each associated with a respective discharge port; means pivotally mounting each flap for pivoting about an axis disposed downstream of the associated discharge port; operating means connected to each flap to pivot the same, through an intermediate position range, between a retracted position in which each flap is within the contour of the enclosure, to a jet thrust controlling position in which each flap overlies its associated discharge port; each flap being formed with an aperture therethrough congruent with its associated discharge port; and deflecting vanes extending across the aperture in each flap and forming deflection channels therebetween which, in the jet thrust controlling position of the associated flap, deflect the gases, discharged through the associated discharge port, in a direction forwardly of the aircraft; said flaps, in the retracted position, directing cooling air, entrained by the jet discharge, in cooling relation with those portions of the enclosure downstream of the discharge ports; said flaps, in the intermediate position range, functioning as aerodynamic brakes; said vanes, when said flaps are in the intermediate range in a position at which they extend substantially normal to the direction of travel of the aircraft, being positioned in the path of the jet streams and deflecting the jet streams laterally of the aircraft.

8. A braking arrangement for jet propelled aircraft having jet engine exhaust gas discharge ports opening through the engine enclosure laterally of the flight direction, said braking arrangement comprising, in combination, flaps, each associated with a respective discharge port; means pivotally mounting each flap for pivoting outwardly of the enclosure about an axis disposed downstream of the associated discharge port; operating means connected to each flap to pivot the same, through an intermediate position range in which each flap acts as a dynamic brake, between a retracted position in which each flap extends rearwardly from its pivot axis and is within the contour of the enclosure, to a jet thrust controlling position in which each flap extends rearwardly from its pivot axis and overlies its associated discharge port; each flap including means operable, in the jet thrust controlling position, to deflect the jet gases, discharged through its associated discharge port, in a direction forwardly of the aircraft; the surface area of each flap being substantially larger than the cross sectional area of the associated discharge port.

9. A braking arrangement for jet propelled aircraft having lateral jet engine exhaust gas discharge ports through the engine enclosure, said braking arrangement comprising, in combination, flaps, each associated with a respective discharge port; means pivotaly mounting each flap for pivoting about an axis disposed downstream of the associated discharge port; operating means connected to each flap to pivot the same, through an intermediate position range, between a retracted position in which each flap is within the contour of the enclosure, to a jet thrust controlling position in which each flap overlies its associated discharge port; each flap being formed with an aperture therethrough congruent with its associated discharge port; and deflecting vanes extending across the aperture in each flap and forming deflection channels therebetween which, in the jet thrust controlling position of the associated flap, deflect the gases, discharged through the associated discharge port, in a direction forwardly of the aircraft; said flaps, in the retracted position, directing cooling air, entrained by the jet discharge, in cooling relation with those portions of the enclosures downstream of the discharge ports; said flaps, in the intermediate position range, functioning as aerodynamic brakes; the surface area of each flap being substantially larger than the cross sectional area of the associated discharge port.

References Cited

UNITED STATES PATENTS

| 1,773,521 | 8/1930 | Davis | 244—113 |
| 2,681,548 | 6/1954 | Kappus | 60—35.54 |
| 3,112,616 | 12/1963 | Adamson et al. | 60—35.54 |
| 3,164,956 | 1/1965 | Colebrook et al. | 60—35.54 |

FOREIGN PATENTS

| 167,904 | 6/1956 | Australia. |

MILTON BUCHLER, *Primary Examiner.*

P. E. SAUBERER, *Assistant Examiner.*